United States Patent
Andrikowich

(10) Patent No.: US 10,616,686 B2
(45) Date of Patent: Apr. 7, 2020

(54) STABILIZED HEADBAND WITH ROTATING SIDE PAD

(71) Applicant: Bose Corporation, Framingham, MA (US)

(72) Inventor: Thomas G. Andrikowich, Whitinsville, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/701,174

(22) Filed: Sep. 11, 2017

(65) Prior Publication Data

US 2018/0302717 A1    Oct. 18, 2018

Related U.S. Application Data

(63) Continuation-in-part of application No. 15/487,612, filed on Apr. 14, 2017.

(51) Int. Cl.
| | | |
|---|---|---|
| H04M 1/05 | (2006.01) | |
| H04R 1/10 | (2006.01) | |
| H04R 5/033 | (2006.01) | |

(52) U.S. Cl.
CPC ............ *H04R 5/0335* (2013.01); *H04M 1/05* (2013.01); *H04R 1/1058* (2013.01);
(Continued)

(58) Field of Classification Search
CPC ............. H04R 2460/13; H04R 5/0335; H04R 1/1066; H04R 2420/07; H04R 1/1041; H04R 1/1083; H04R 2201/107; H04R 1/1025; H04R 1/1016; H04R 1/105; G02C 3/003; G02C 11/00; G02C 11/02;
(Continued)

(56) References Cited

U.S. PATENT DOCUMENTS

| | | | | |
|---|---|---|---|---|
| 5,345,512 A | * | 9/1994 | Lee ................ | H04R 1/1066 181/136 |
| 6,406,811 B1 | * | 6/2002 | Hall ................ | H04R 1/1025 429/96 |

(Continued)

FOREIGN PATENT DOCUMENTS

| | | | | |
|---|---|---|---|---|
| WO | 0055672 A1 | | 9/2000 | |
| WO | WO-0055672 A1 | * | 9/2000 | ......... G02B 27/0176 |

OTHER PUBLICATIONS

Final Office Action in U.S. Appl. No. 15/487,612 dated Jul. 20, 2018; 22 pages.
(Continued)

*Primary Examiner* — Fan S Tsang
*Assistant Examiner* — Julie X Dang
(74) *Attorney, Agent, or Firm* — Schmeiser, Olsen & Watts LLP; V. Raman Bharatula

(57) ABSTRACT

A stabilized headband may include a pivot mechanism. The pivot mechanism may be configured so that at least one pad is pivotable about at least one pivot axis and disposed between the at least one pad and one of first and second ends of the headband. The stabilized headband may further include a rotation mechanism. The rotation mechanism may be configured so that the at least one pad is rotatable about at least one rotation axis and disposed between the at least one pad and the one of the first and second ends of the headband.

24 Claims, 7 Drawing Sheets

(52) U.S. Cl.
CPC ......... *H04R 1/1066* (2013.01); *H04R 1/1091* (2013.01); *H04R 1/1008* (2013.01); *H04R 1/1016* (2013.01); *H04R 2201/107* (2013.01)

(58) Field of Classification Search
CPC ................ G02C 11/04; G02C 2200/02; G02C 2200/08; G02C 5/02; G02C 5/14; G02C 7/02; G02C 9/00; G02C 9/04
USPC ....... 381/381, 380, 370, 151, 376, 378, 379; 181/128, 135
See application file for complete search history.

(56) References Cited

U.S. PATENT DOCUMENTS

| | | | | |
|---|---|---|---|---|
| 6,456,721 | B1* | 9/2002 | Fukuda | H04R 1/1066 381/151 |
| 6,721,433 | B2* | 4/2004 | Sato | H04R 5/0335 181/128 |
| 6,904,147 | B2 | 6/2005 | Lenz et al. | |
| 8,488,814 | B2* | 7/2013 | Robuchon | H04R 1/1066 381/151 |
| 2003/0128838 | A1* | 7/2003 | Lenz | H04M 1/05 379/430 |
| 2006/0291686 | A1* | 12/2006 | Hlas | H04R 1/086 381/381 |
| 2010/0034414 | A1 | 2/2010 | Miyata | |
| 2011/0051960 | A1* | 3/2011 | Robuchon | H04R 1/1066 381/151 |
| 2011/0129111 | A1* | 6/2011 | Santiago | H04R 5/0335 381/379 |
| 2011/0206216 | A1* | 8/2011 | Brunner | H04R 1/1066 381/74 |
| 2012/0280824 | A1 | 11/2012 | Zelepugas | |
| 2014/0010389 | A1* | 1/2014 | Slocum | H04R 1/1066 381/309 |
| 2015/0041243 | A1* | 2/2015 | Ratliff | A42B 3/166 181/129 |
| 2016/0173968 | A1 | 6/2016 | Fargeau et al. | |
| 2016/0323663 | A1* | 11/2016 | Nisse | H04R 1/1008 |

OTHER PUBLICATIONS

International Search Report and Written Opinion in International Patent Application No. PCT/US18/27214, dated Jun. 19, 2018; 16 pages.
Office Action for U.S. Appl. No. 15/487,612, dated Apr. 10, 2018.
Notice of Allowance in U.S. Appl. No. 15/487,612 dated Oct. 29, 2018; 9 pages.
International Preliminary Report on Patentability in International Application No. PCT/US2018/027214, dated Oct. 24, 2019; 10 pages.

* cited by examiner

STABILIZED HEADBAND WITH ROTATING SIDE PAD

RELATED APPLICATION

This application is a continuation-in-part application of U.S. application Ser. No. 15/487,612, filed Apr. 14, 2017 and titled "STABILIZED HEADBAND," the entirety of which is incorporated by reference herein.

BACKGROUND

This disclosure generally relates to communications headsets. More particularly, the disclosure relates to a headband that provides comfort and remains in a stable position when worn on the head.

SUMMARY

In an embodiment, a stabilized headband may include a rotation mechanism configured so that at least one pad is rotatable about at least one rotation axis. The rotation mechanism may be disposed between the at least one pad and the one of the first and second ends of the headband.

One or more of features may be included. The at least one pad may have a forward end and a back end. The rotation mechanism may be disposed at a location closer to the back end of the pad than the forward end of the pad. The rotation mechanism may include a rotating member to enable rotation about the at least one rotation axis.

In an embodiment, a stabilized headband may include a pivot mechanism configured so that at least one pad is pivotable about at least one pivot axis and disposed between the at least one pad and one of first and second ends of the headband. The stabilized headband may further include a rotation mechanism configured so that the at least one pad is rotatable about at least one rotation axis and disposed between the at least one pad and the one of the first and second ends of the headband.

One or more of features may be included. The at least one pad may have a forward end and a back end. The pivot and rotation mechanisms may be disposed at a location closer to the back end of the pad than the forward end of the pad. The pivot mechanism may include a hinge mechanism to enable pivoting about a hinge axis. The rotation mechanism may include a rotating member to enable rotation about the at least one rotation axis. In one aspect, a stabilized headband includes a headband and at least one pad. The headband has a first end and a second end. The at least one pad has a contoured surface to engage a head of a user in a contact region. The at least one pad may be pivotably and rotatably coupled to the headband at a location proximate to one of the first and second ends of the headband. A pivot mechanism may be disposed between the at least one pad and the one of the first and second ends of the headband so that the at least one pad is pivotable about at least one pivot axis. A rotation mechanism may be disposed between the at least one pad and the one of the first and second ends of the headband so that the at least one pad is rotatable about at least one rotation axis. When the headband is worn on the head, the at least one pad extends from a region above an ear of the user to behind the ear of the user.

Examples may include one or more of the following features:

The at least one pad may have a forward end and a back end with the pivot mechanism disposed at a location closer to the back end of the pad than the forward end of the pad.

The pivot mechanism may be configured so that the at least one pad is pivotable about at least one pivot axis and includes one or more of a ball joint, a compliant joint or a hinge mechanism to enable pivoting about a hinge axis. The compliant joint may include an elastomeric material disposed between the headband and the at least one pad.

The rotation mechanism may be disposed at a location closer to the back end of the pad than the forward end of the pad. The rotation mechanism may be configured so that the at least one pad is rotatable about at least one rotation axis. The rotation mechanism may enable the at least one pad to rotate so that the at least one pad is substantially aligned with the one of the first and second ends of the headband. The rotation mechanism may include one or more of a rotating member to enable rotation about the at least one rotation axis, a retaining ring, a spring, and a retaining pin. The hinge mechanism may include a retaining pin to enable pivoting about a hinge axis. The hinge mechanism may also include a knuckle received by a rotating member and retained by a retaining pin.

The contoured surface may substantially match a contour of the head in the contact region.

The headband may include an arcuate section that extends between the first and second ends with the at least one pad is pivotally coupled to the headband at a position behind the arcuate section when the headband is worn on the head of the user. When the headband is worn on the head, the arcuate section of the headband may be further forward on the head than the first and second ends of the headband.

The at least one pad may include a rigid bracket and a compliant layer attached to the rigid bracket. The at least one pad may include a compliant member. The compliant member may have a spatially-varying thickness and/or a spatially-varying density.

The stabilized headband may further include at least one in-ear headphone attached to the headband. The stabilized headband may further include a boom microphone attached to the headband.

In accordance with another aspect, a personal communications headset includes a headband, a first pad, a second pad, a first in-ear headphone, a second in-ear headphone and a boom microphone. The headband has a first end and a second end. The first pad may be pivotably and rotatably attached to the headband proximate to the first end of the headband and has a first contoured surface to engage a head of a user at a first contact region. The second pad may be pivotably and rotatably attached to the headband proximate to the second end of the headband and has a second contoured surface to engage the head of the user at a second contact region. The first in-ear headphone is attached to the headband between the first end and the first pad, and the second in-ear headphone is attached to the headband between the second end and the second pad. Each of the first and second in-ear headphones is configured to generate an audio signal in response to a received communications signal. The boom microphone is attached to the headband.

Examples may include one or more of the following features:

The personal communications headset may further include a first pivot mechanism disposed between the first pad and the headband and a second pivot mechanism disposed between the second pad and the headband. Each of the first and second pivot mechanisms is configured to enable the first and second pads, respectively, to pivot about at least a pivot axis relative to the headband.

The personal communications headset may further include a first rotation mechanism disposed between the first pad and the headband and a second rotation mechanism disposed between the second pad and the headband. Each of the first and second rotation mechanisms may be configured to enable the first and second pads, respectively, to rotate about at least a rotation axis relative to the headband. The first and second rotation mechanisms may enable the first and second pads to rotate, respectively, so that the first pad is substantially aligned with the first end of the headband and the second pad is substantially aligned with the second end of the headband.

Each of the first and second pads may have a forward end and a back end. The first and second pads may be pivotably and rotatably attached to the headband at locations on the pads closer to the back ends than the forward ends. Each of the first and second pivot mechanisms may include a hinge mechanism to enable at least partial pivoting about a hinge axis. Each of the first and second rotation mechanisms may include a rotation mechanism to enable at least partial rotating about the rotation axis.

The first contoured surface may substantially match a contour of the head in the first contact region and the second contoured surface may substantially match the contour of the head in the second contact region.

The boom microphone may include a velocity microphone. The first and second pads may have the same shape. The first contoured surface and second contoured surface may have different contours.

The headband may include an arcuate section that extends between the first and second ends with each of the first and second pads pivotally attached to the headband at a position behind the arcuate section when the personal communications headset is worn on the head of a user. The arcuate section of the headband may be further forward on the head than the first and second ends of the headband when the personal communications headset is worn on the head of a user.

In accordance with another aspect, a stabilized headband includes a headband, a first pad and a second pad. The headband has a first end, a second end and an arcuate section extending between the first and second ends. The first pad has a first contoured surface to engage a head of a user in a first contact region. The second pad has a second contoured surface to engage the head of the user in a second contact region. The first and second pads are pivotably and rotatably coupled to the headband proximate to the first and second ends, respectively, at a location that may be behind the arcuate section when the headband is worn on a head of a user. The arcuate section defines a headband plane which defines a non-zero angle with respect to a vertical plane when the headband is worn on the head of the user.

Examples may include one or more of the following features:

Each of the first and second pads may have a forward end and a back end, with the first and second pads pivotally and rotatably coupled to the headband at a location on the pad that is closer to the back end than the forward end.

When the headband is worn on the head, the arcuate section of the headband may be further forward on the head than the first and second ends of the headband.

The first contoured surface may substantially match a contour of the head in the first contact region and the second contoured surface may substantially match the contour of the head in the second contact region.

BRIEF DESCRIPTION OF THE DRAWINGS

The above and further aspects of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Figure 1A:
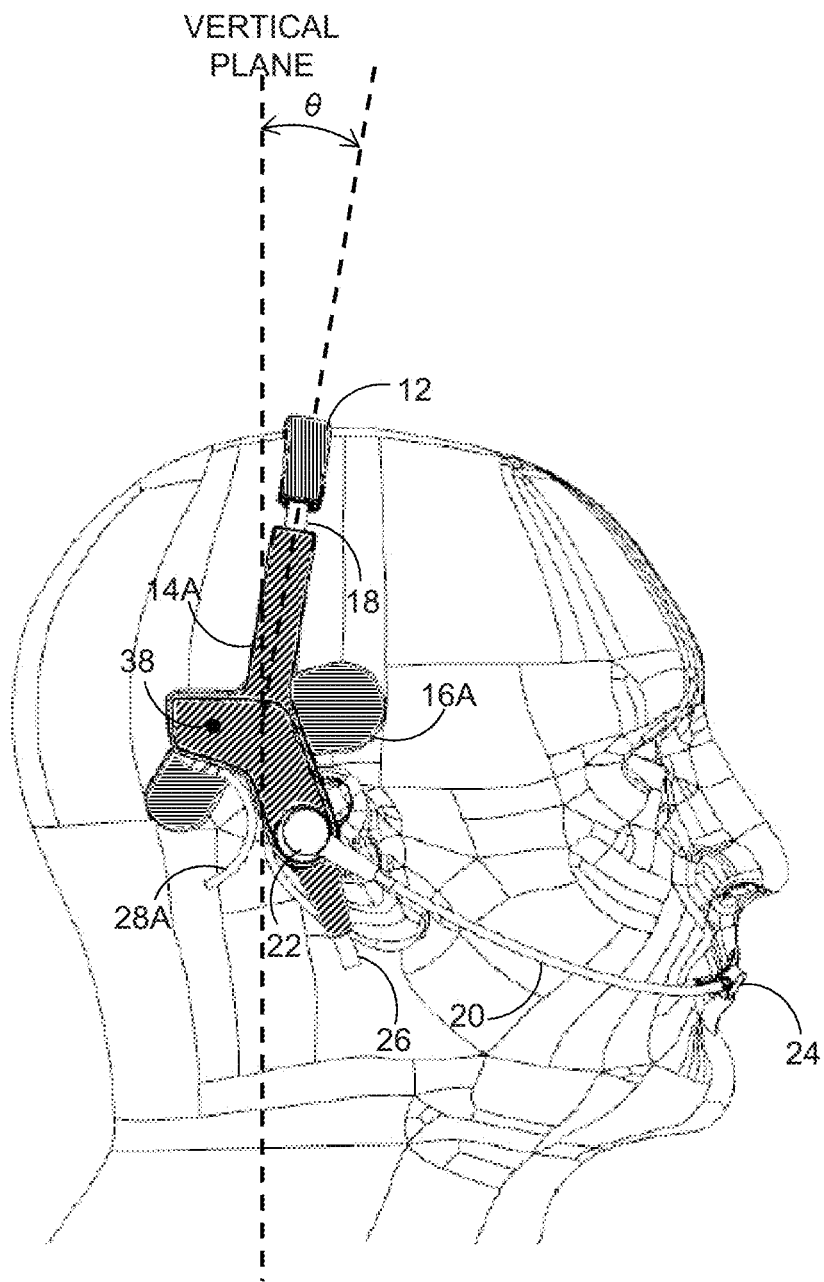
FIG. 1A is a front view of an example of a personal communications headset worn on the head of a user.

Aviation headsets are used by pilots in both general aviation and commercial aviation. Such headsets can be connected to aircraft communication systems, for example to communicate with air-traffic control (ATC) or with other pilots. The headsets can also be used as part of a public address system, for example, for the pilots to speak with passengers on board the aircraft. The headsets generally include a microphone positioned at the end of a boom in front of the mouth of the speaker. The microphone may be of numerous types, including but not limited to velocity microphones and pressure microphones. In some examples, the microphone is a velocity microphone which generates an output signal that is responsive to the instantaneous velocity of the air molecules in the incident acoustic energy. Velocity microphones generally have robust far field noise cancelling capability at frequencies that include the dominant types of aircraft noise. Thus, velocity microphones are generally preferable to other types of microphones (e.g., pressure microphones) in aircraft and in other environment having similar background noise. However, velocity microphones are sensitive to changes in position, and require accurate and stable placement in the vicinity of a user's mouth. For example, any motion of the microphone relative to the mouth of a user can result in unwanted modulation of the microphone signal generated in response to the user's speech. While a velocity microphone may be preferred in certain environments, other microphone types may be used.

On-ear and over-ear headsets may provide a sufficient clamping force to a wearer's head so that a microphone positioned at the end of a boom remains in a relatively stable position in front of the user's mouth. For example, as the user moves about the aircraft or during movement of the user's head to view instrumentation, the microphone generally remains in position in front of the user's mouth. On-ear and over-ear headsets are relatively bulky and less portable in comparison to an in-ear headset. Commercially-available in-ear headsets are more portable; however, the use of a boom microphone on an in-ear headset can result in movement of the microphone relative to the user's mouth during motion of the user's head or body due to the compliance of the ear canal, the compliance of eartips on the earbuds and/or the ineffectiveness of other stabilizing mechanisms used to support the microphone.

The examples of headbands described herein are suitable for use in in-ear headsets that may be worn by aviators, aircraft personnel and other users exposed to a high noise environment, and that may be used in other applications where a headset with a microphone positioned in front of the mouth of the user is desired. The headset is portable and provides proper positioning of the microphone relative to the mouth. Moreover, the headset has improved stability such that the microphone remains substantially fixed in position regardless of user activity. Consequently, modulation of the microphone signal relative to conventional in-ear headsets is reduced or eliminated, regardless of user activity. Moreover, the headband includes support pads that reduce or eliminate user discomfort from the clamping force applied to the head.

Applications outside of the aviation context may also use a headset with a microphone positioned at the end of a boom so that the microphone is placed in front of the mouth of the speaker. For example, such headsets are used in broadcasting, call centers, video game applications, personal communications, coaching and training (e.g., coaches on the sidelines, personnel in a booth, personal trainers, etc.), lectures, and others. While the aviation environment is used as an example application for the headset described herein, the headset described herein can be used in any application where a headset is used with a microphone positioned at the end of a boom so that the microphone is placed in front of the mouth of the speaker, as well as in applications where a headset with a comfortable and stable headband is desired.

Figure 1B:
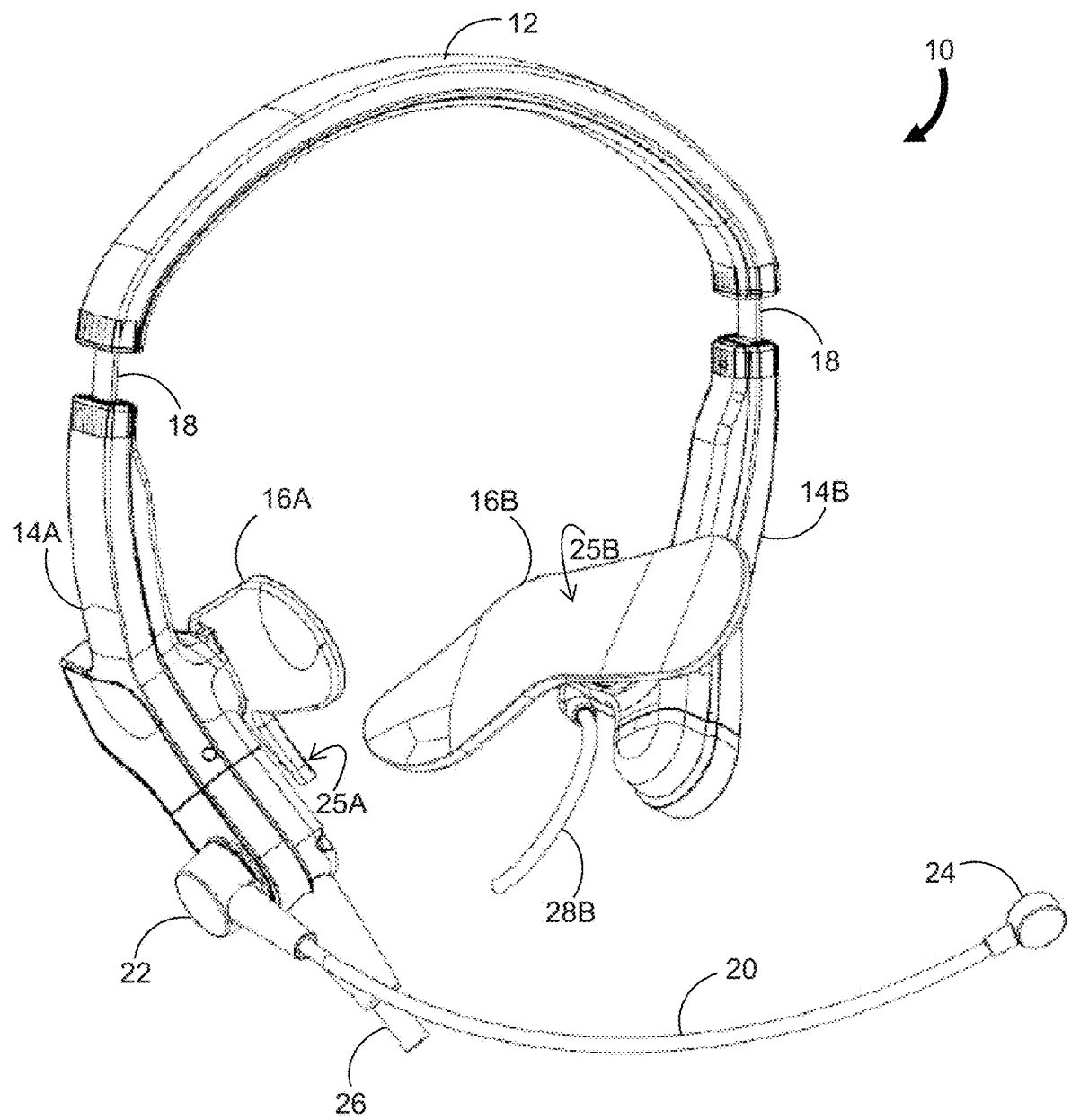
FIG. 1B is a perspective view of the personal communications headset of FIG. 1A removed from the head.

FIG. 1A shows a side view of an example of a personal communications headset 10 (e.g. an aviation headset) worn on the head and FIG. 1B shows the headset 10 removed from the head and in a relaxed state. Reference numbers followed by an "A" or a "B" indicate a feature that corresponds to the right side or the left side, respectively, of the headset 10. The headset 10 includes a headband having an arcuate section 12, a right end and a left end. A right housing 14A and a left housing 14B are located at the right end and the left end, respectively, of the headband. The arcuate section 12 serves as an over-the-head bridge between the right and left housings 14. A spring band 18 (e.g., spring steel) extends from the right housing 14A, through the arcuate section 12 and to the left housing 14B. The spring band 18 provides a clamping force to move the housings 14 toward each other (approximately along a horizontal plane through the wearer's head) while the headband is worn by a user. The right and left housings 14 can be moved a distance either up and toward or down and away from the arcuate section 12 to accommodate a smaller or larger head, respectively.

A pad (right pad 16A or left pad 16B, generally 16) is attached to each housing 14 and is used to comfortably secure the headset 10 to the head. As used herein, a "pad" means a compliant member that can compress and/or deform under an applied pressure and that is configured for contact with the head of a user in a manner that supports the headband. For example, the compliant member may include a compliant material such as a foam or a compliant elastomer, as well as an inflatable or liquid-filled member. Compliance may be controlled by varying the thickness or taper of the pad 16, controlling the spatial variance of the density of the material across the pad 16, and/or by controlling the spatial variance of the combination of two or more materials in the pad 16. The compliant member may include two or more materials having different geometries. A pad 16 may also include a rigid bracket (not shown) that holds the compliant member and allows for convenient coupling to the housing 14. In one specific example, each pad 16 is a foam cushion wrapped in a synthetic leather material (e.g., leatherette or pleather). The foam cushion may be an open cell or closed cell polyurethane foam, or may include silicone rubber. Each pad 16 is pivotally (or pivotably) coupled to one of the housings 14 to allow pivoting about one or more axes. Each pad 16 includes a contoured surface 25 that substantially matches a contour of the head in a "contact region" where the pad 16 is adjacent to the head. In a specific non-limiting example, the contoured surface 25 may have a contour of a 50% male head, that is, a median-sized head for a population of male heads. Matching the contoured surface 25 to the contact region on the head results in increased comfort as the force applied through the pad 16 is distributed about the pad surface area. The compliance allows the pad 16 to more accurately conform to the contour in the contact region when there is a mismatch between the contours of the pad and the contact region. When the headset 10 is worn on the head, each pad 16 extends from its forward end above the ear to its back end, which is lower on the head and behind the ear. Thus, the pads 16 avoid applying pressure in front of the ear and in the temple region where user sensitivity is greater and discomfort would typically result.

The illustrated example of the in-ear headset 10 depicts the two pads 16 having complementary geometries such that the pads 16 have the same surface areas and thicknesses, and have complementary contoured surfaces 25. By way of a specific non-limiting numerical example, the surface area of each pad 16 may be approximately 1700 $mm^2$. In alternative examples the pads may have different surface areas and/or different thicknesses. In addition, the contoured surfaces may be different, for example, if the two pads are configured to engage the head at contact regions that are not symmetrically opposed.

A boom 20 extends from a rotatable base 22 near the bottom of one of the housings (e.g., as illustrated, the right housing 14A) and is used to position and support a microphone 24 attached at the other end. The boom 20 may be adjusted, in part, by rotation about its base 22 to place the microphone 24 in proper position with respect to the mouth of the user. The boom 20 may be permanently affixed to the housing 14A or may be removable so that the portable headset 10 can be used for both aviation and non-aviation uses (e.g., music playback).

A connector 26 for a communications cable extends from the bottom of the right housing 14A. The communications cable may have one or more conductors to conduct electrical signals such as a microphone signal and/or an audio signal. The communications cable may include a control module to provide control of one or more operating parameters of the headset and may also include a source of electrical power (e.g., batteries). The communications cable may have one or more connectors to couple the headset 10 to an aircraft communications system.

An earbud connector cable 28 extends at one end from each housing 14. The opposite end of the flexible cable 28 is suitable for connecting to an earbud or other type of in-ear headphone. Advantageously, any change in the position of the earbuds with respect to the ear canals of the user results in no adverse effect on the positioning of the microphone 24 with respect to the user's mouth.

Figure 2:
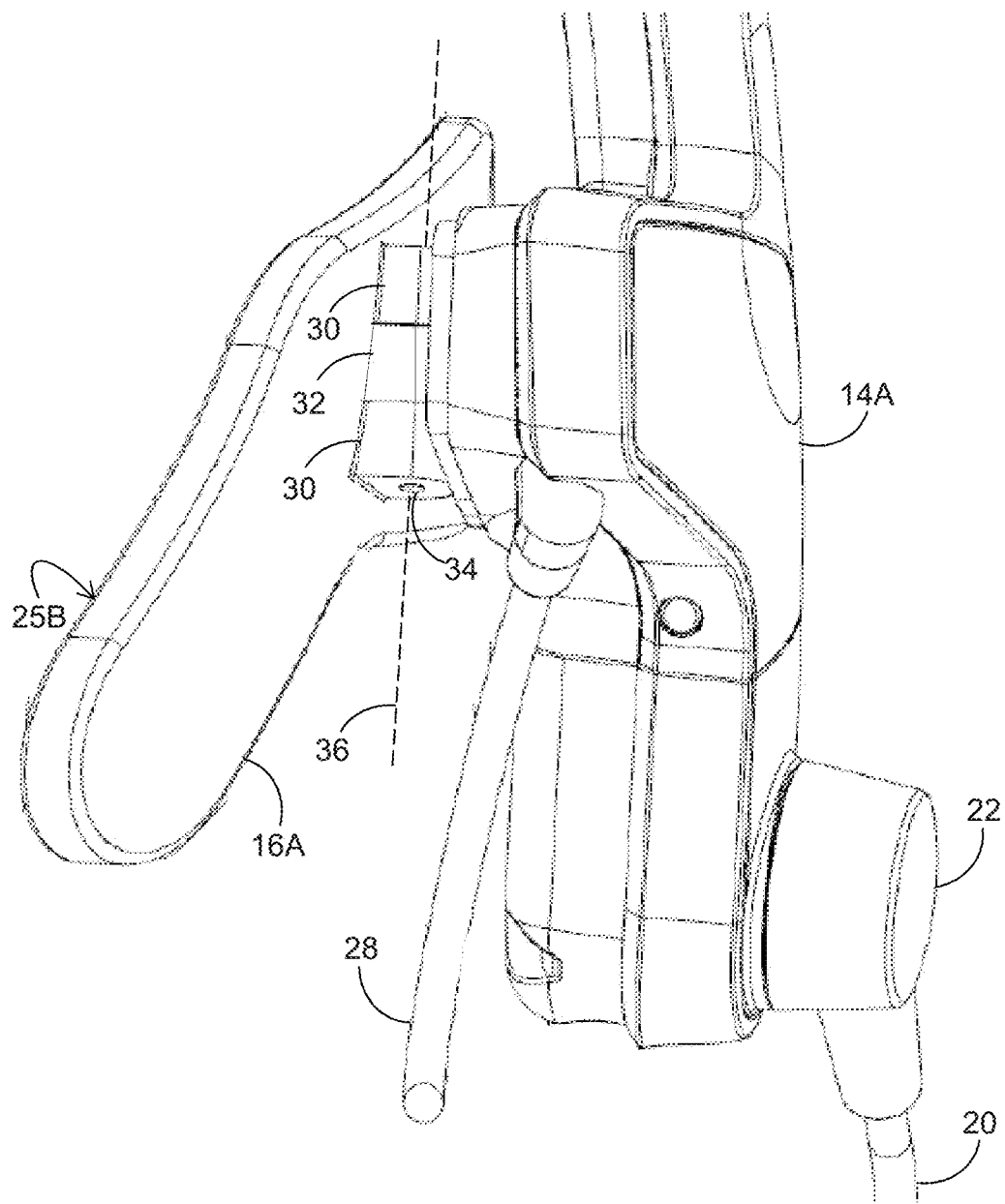
FIG. 2 is an expanded view of the left end of the example of a personal communications headset shown in FIG. 1A.

FIG. 2 shows a rear and expanded view of the right housing 14A and attached features. The pad 16A has a shape (i.e., perimeter) that defines the contact region on the head. The surface 25A on the inner side of the pad 16A has a non-planar contour that is substantially matched to the shape of the head in the contact region to ensure near-full contact. In one example, the shape is based on measurements of head shapes and contours for a large measurement population and the contour is defined for "a median head" as determined from the measurements. Ensuring near-full or full contact with the head, the force applied to the head is more evenly distributed across the surface area of the pad 16. A larger pad generally results in a lower applied pressure; however, the preference for increased pad size is generally limited to maintain reasonable portability for the headset.

Referring to FIG. 1A, when the headset 10 is positioned on a head, the arcuate section 12 of the headband and upper portions of the two housings 16 lie in a plane (into the page) that defines an angle θ with respect to a vertical plane (into the page). By way of a non-limiting example, the angle θ may be approximately 15°. Thus, at least some portions of the arcuate section 12 are further forward on the head relative to the housings 14. The force applied to each pad 16 is through a pivot point where the pad 16 is coupled to the housing 14. The pivot point is closer to the back end of each pad 16, therefore there may be a tendency for the pads 16 to slide backward on the head. Any tendency to slide backward is counteracted by the reactive force applied between the head and the headband in the forward portion, that is, the region where the arcuate section 12 is in contact with the head.

Figure 3:
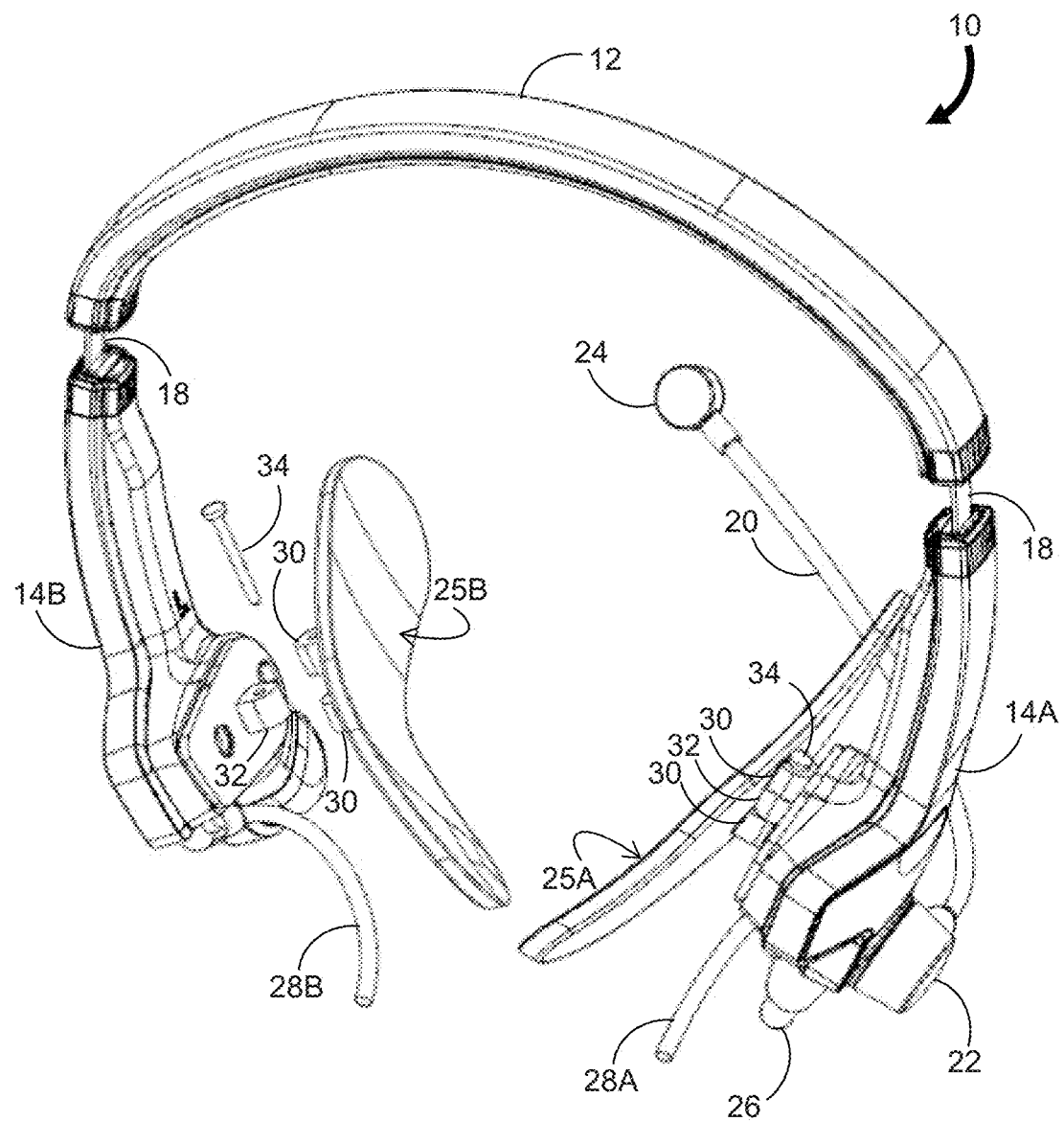
FIG. 3 is view of the personal communications headset of FIG. 2 with one of the pads removed to show the hinge pivot mechanism.

FIG. 2 shows a pivot mechanism where the force is transferred from the right housing 14A to the pad 16A. In this illustrated example, the pivot mechanism is a hinge-type mechanism that includes two housing knuckles 30 protruding inward from the right housing 16A and a single intervening pad knuckle 32 protruding outward from the outer pad surface. Similar to a conventional door hinge, a hinge pin 34 passes through the opening in the three knuckles 30 and 32. Thus, the pad 16A can pivot with respect to the housing 14A about the hinge axis (axis of pin) 36. This pivoting allows the pad 16A to achieve a better fit against a user's head and further increase the comfort to the user. FIG. 3 shows the headset 10 with the other (left) pad 16B and its hinge pin 34 removed for clarity.

Although illustrated as a hinge-type pivot mechanism, other forms of pivot mechanisms may be used. For example, a dual-axis pivot mechanism may be used or a multi-axis pivot mechanism, such as a ball and socket joint, may be used for additional pivoting and/or rotational freedom. In yet another alternative example, the pivot mechanism may be a compliant joint. For example, the compliant joint may include an elastomeric material (e.g. silicone rubber) disposed in one or more locations between the housing 14 and pad 16. In some examples, the pad may be removably attached to the pivot mechanism, enabling different sized pads to be attached to the headset to accommodate different head shapes and sizes.

A further improvement in comfort is achieved by locating the pivot mechanism, and therefore the location of the applied force, away from the forward end and closer to the back end of the pad 16A (see pivot point 38 in FIG. 1A). Thus, the pressure (and reactive force) near the back of the pad 16 where the head is less sensitive to pressure is greater than the pressure near the front of the pad which is closer to the temple and more sensitive. In one non-limiting example, the pressure is distributed across the pad 16 so that approximately 80% of the pressure is towards the back of the pad and 20% of the pressure is near the front of the pad. This distribution of pressure increases comfort without sacrificing the clamping force of the headband.

Figure 4:
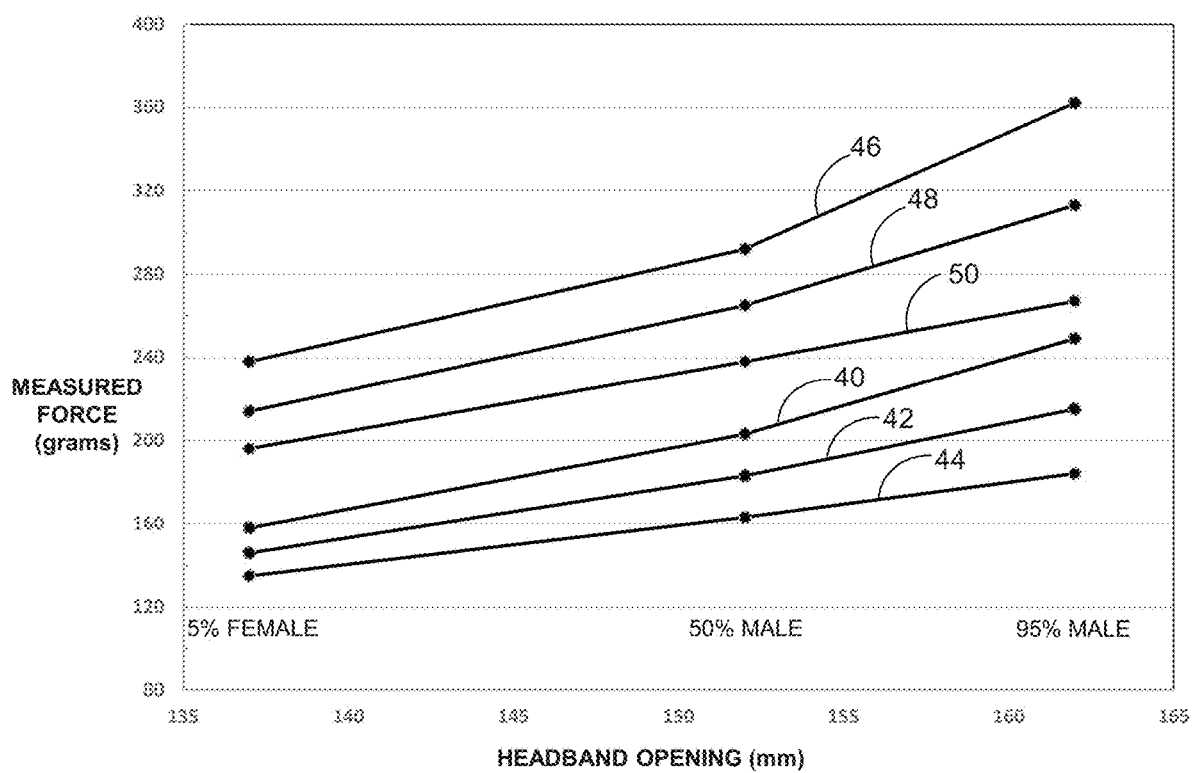
FIG. 4 is a graphical representation of a measured clamping force applied to the head of a user by a headset as a function of three human head models.

FIG. 4 is a graphical representation of the clamping force (the force the headset exerts against the head when worn, measured in grams) as a function of three headband openings (the distance between the two pads of the headset, measured in mm). The smallest opening value corresponds to an opening for a $5^{th}$ percentile female head, the intermediate opening value corresponds to a $50^{th}$ percentile male head and the largest opening corresponds to a $95^{th}$ percentile male head. Plots 40, 42 and 44 depict the force applied for no extension, an extension of 12 mm and an extension of 25 mm, respectively, for a headband having a 0.7 mm thick spring band 18 (see FIG. 1). The extension refers to a vertical displacement of the top of the headband from the lower portions of the headband. More specifically, the arcuate section 12 may be pulled upward away from the housings 14 or pushed downward toward the housings 14 to accommodate larger or smaller head sizes, respectively (see FIG. 1B). A greater extension means a greater vertical displacement of the top of the headband from the lower portions of the headband and therefore a lower force is required to "open" the headband. Plots 46, 48 and 50 depict the force applied for no extension, an extension of 12 mm and an extension of 25 mm, respectively, for a headband having a 0.8 mm thick spring band. The range of clamping force that can be applied by a headband with a specific headband opening is based on the difference between the no extension and maximum extension forces at that opening value.

Figures 5A, 5B:
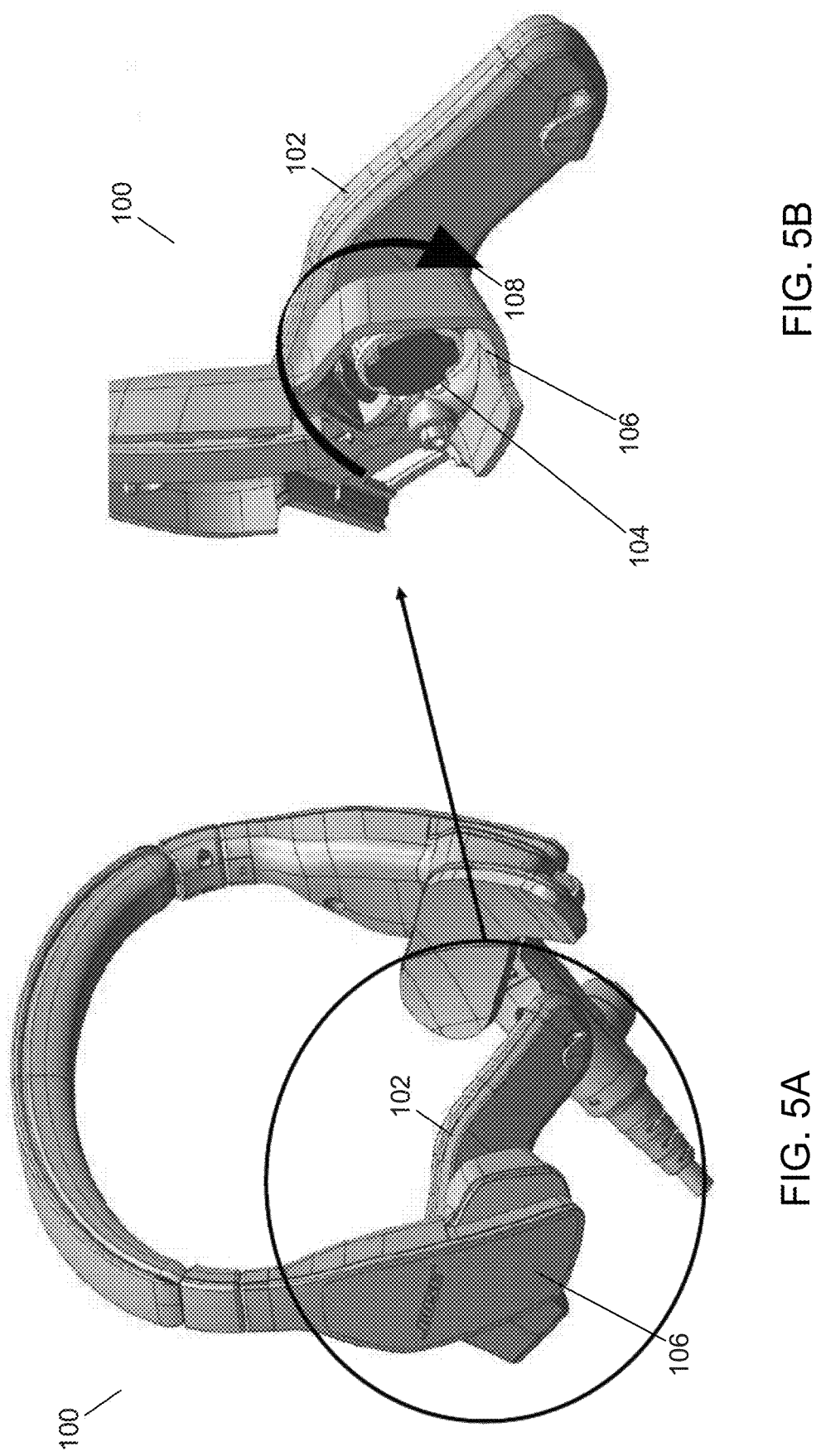
FIG. 5A is a perspective view of an example personal communications headset removed from the head.
FIG. 5B is an expanded view of a rotating mechanism of the example personal communications headset shown in 5A.

Referring to FIG. 5A, an example headset 100 is shown. Headset 100 may be similar to headset 10 shown in FIG. 1B and may include similar components to headset 10. In an embodiment, headset 100 may include a different pivoting mechanism for the side pad or pads than headset 10. Further, in an embodiment, headset 100 may include an additional rotation mechanism for the side pad or pads.

Referring to FIG. 5B, an expanded view of headset 100 shows an interior of a right housing 106 of headset 100. As shown in FIG. 5B, side pad 102 may include a rotation mechanism 104 that allows side pad 102 to rotate (as depicted by arrow 108) about a rotation axis with respect to headset 10. The rotation axis may be different than the hinge axis (or pivot axis) described above. Rotation mechanism 104 may allow side pad 102 to rotate such that side pad 102 is substantially aligned with right housing 106 of headset 100.

Rotation mechanism 104 may be included in a headband or housing of headset 100 and may include one or more of a spring, retaining ring, retaining pin, and rotating member that allow side pad 102 to rotate. This rotation may further help a user position the headband, side pads, and/or headset on his or her head. The flexibility added by rotation mechanism 104 may allow the user to more easily move the side pad or pads to a comfortable location or locations on his or her head. Further, the rotation may also allow the headset to be more compact for storage in a carrying case. In an implementation, the headset may fold into a more compact shape for storage in the carrying case.

Figure 5C:
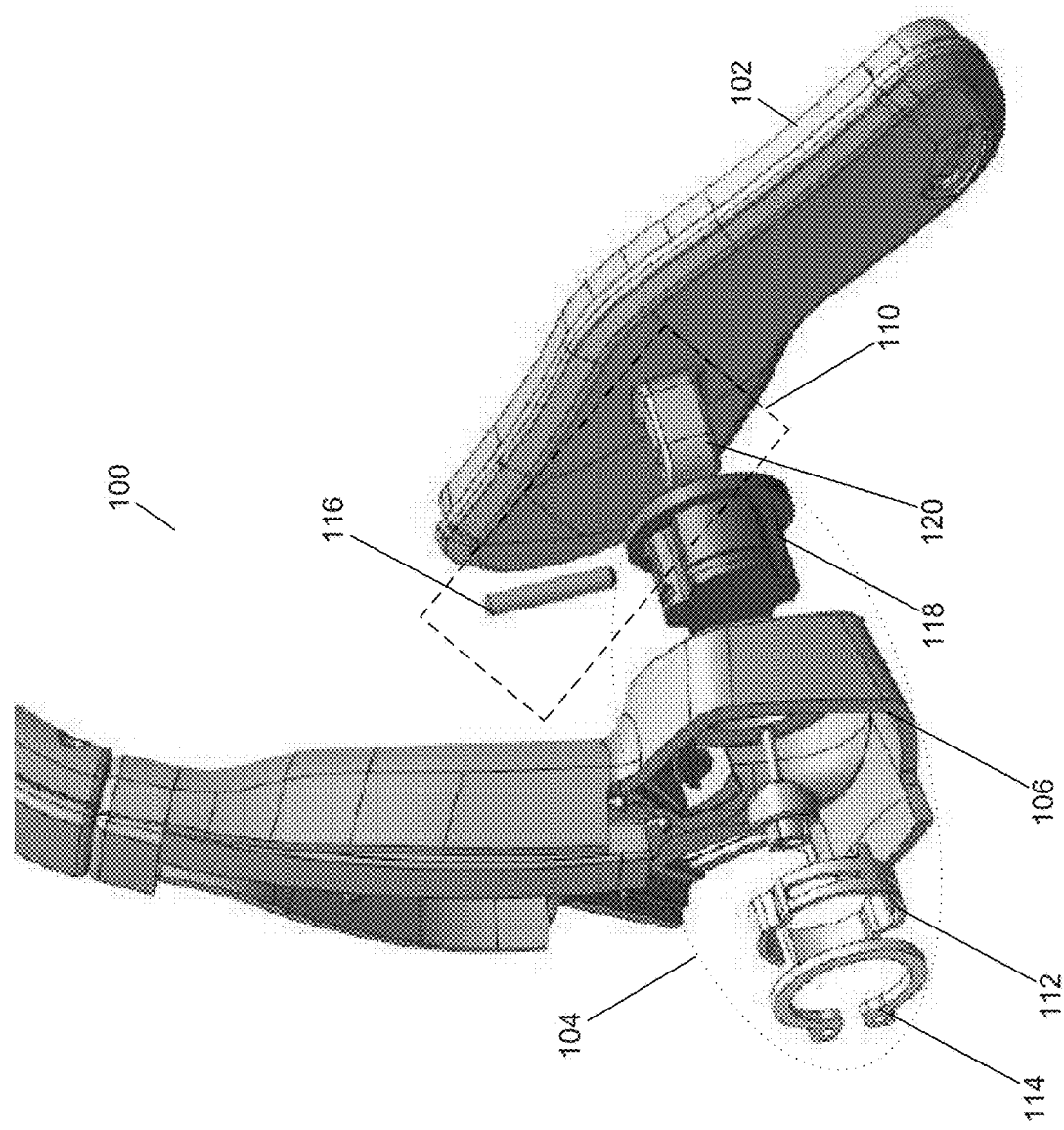
FIG. 5C is an expanded view of the right end of the example of a personal communications headset shown in 5A.

Side pad 102 may have a contoured surface to engage a head of a user in a contact region and may be pivotably and rotatably coupled to the headband at a location proximate to one of the first and second ends of the headband. Referring now to FIG. 5C, a blown up view of headset 100 showing the interior of right housing 106 and rotation mechanism 104 is shown. FIG. 5C also shows a pivot mechanism 110. Various components of rotation mechanism 104 may also be components of pivot mechanism 110, and various components of pivot mechanism 110 may also be components of rotation mechanism 104.

Rotation mechanism 104 may be disposed between the side pad 102 and one end of the headband. Rotation mechanism 104 may be configured so that side pad 102 is rotatable about at least one rotation axis. Rotation mechanism 104 may include one or more of spring 112, retaining ring 114, retaining pin 116, and rotating member 118 that allow side pad 102 to rotate about the rotation axis.

In an implementation, spring 112 may be substantially circular in shape and may support rotation of rotation member 118 and side pad 102 about the rotation axis. Spring 102 may allow the user to rotate side pad 102 in a more controlled manner. Retaining ring 114 may also be substantially circular in shape and may operate to hold spring 112 and rotation member 118 in place in right housing 106. Retaining pin 116 may sit in a hole or bore created in rotation member 118 and in another hole or bore created in pad knuckle 120, all of which may operate together to secure side pad 102 to right housing 106, yet still allowing rotation of side pad 102.

Rotation member 118 may be substantially cylindrical in shape and may also be shaped to receive pad knuckle 120 and retaining pin 116. Both rotation member 118 and pad knuckle 120 may include substantially aligned holes or bores such that both rotation member 118 and pad knuckle 120 may receive retaining pin 116.

Pivot mechanism 110 may also be disposed between the side pad 102 and one end of the headband. Pivot mechanism 110 may be configured so that side pad 102 is pivotable about at least one pivot axis. Pivot mechanism 110 may include pad knuckle 120 and retaining pin 116.

In an implementation, as discussed above, retaining pin 116 may sit in a hole or bore created in rotation member 118 and in another hole or bore created in pad knuckle 120. Pad knuckle 120, retaining pin 116 and rotation member 118 may operate together as a hinge mechanism or system, and may allow side pad 102 to pivot about the pivot axis. The pivot axis may be substantially perpendicular to the rotation axis in at least one position of side pad 102. In an implementation, pad knuckle 120, retaining pin 116 and rotation member 118 may sit substantially stationary and may not allow side pad 102 to pivot about the pivot axis. In this implementation, headset 100 may include only a rotation mechanism and the components of the pivot mechanism may be used to secure side pad 102 to right housing 106.

In an embodiment, a second side pad may be rotatably and/or pivotably attached to the headband proximate to another end of the headband (e.g., a left side of the headband) and may have a second contoured surface to engage the head of the user at a second contact region. The second side pad may also include a rotation mechanism and/or a pivot mechanism similar to rotation mechanism 104 and/or pivot mechanism 110, respectively. Each pad may have a forward end and a back end and be pivotably and/or rotatably attached to the headband at locations on the pads closer to the back ends than the forward ends, respectively.

As discussed above, in an embodiment, headset 100 and side pad 102 may include only a rotation mechanism. The rotation mechanism may include components from both rotation mechanism 104 and pivot mechanism 110 and may be configured so that side pad 102 is rotatable about at least one rotation axis, but not necessarily pivotable about at least one pivot axis. In other words, various components of both rotation mechanism 104 and pivot mechanism 110 may form a single rotation mechanism holding the components of both rotation mechanism 104 and pivot mechanism 110 together and operating such that side pad 102 is rotatable about at least one rotation axis.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. A stabilized headband, comprising: a headband having a first, end and a second end;
    at least one pad having a contoured surface to engage a head of a user in a contact region, the at least one pad pivotably and rotatably coupled to the headband at a location proximate to one of the first and second ends of the headband;
    the at least one pad pivotably coupled to the headband proximate to the one of the first and second ends of the headband using a pivot mechanism provided by a part so that the at least one pad is pivotable about at least one pivot axis, wherein the pivot mechanism is within a housing;
    the at least one pad rotatably coupled to the headband proximate to the one of the first and second ends of the headband using a rotation mechanism provided by another part so that the at least one pad is rotatable about at least one rotation axis, wherein the rotation mechanism is within the housing; and
    wherein said part is within said another part and when the headband is worn on the head, the at least one pad extends from a region above an ear of the user to behind the ear of the user.

2. The stabilized headband of claim 1 wherein the at least one pad has a forward end and a back end, and wherein the pivot mechanism is disposed at a location closer to the back end of the pad than the forward end of the pad.

3. The stabilized headband of claim 1 wherein the pivot mechanism comprises a hinge mechanism to enable pivoting about a hinge axis.

4. The stabilized headband of claim 1 wherein the pivot mechanism comprises at least one of: a ball joint and a compliant joint.

5. The stabilized headband of claim 1 wherein the contoured surface substantially matches a contour of the head in the contact region.

6. The stabilized headband of claim 1 wherein the headband includes an arcuate section extending between the first and second ends and wherein the at least one pad is pivotally coupled to the headband at a position behind the arcuate section when the headband is worn on the head of the user.

7. The stabilized headband of claim 6 wherein, when the headband is worn on the head, the arcuate section of the headband is further forward on the head than the first and second ends of the headband.

8. The stabilized headband of claim 1 further comprising at least one in-ear headphone attached to the headband.

9. The stabilized headband of claim 1 wherein the at least one pad has a forward end and a back end, and wherein the rotation mechanism is disposed at a location closer to the back end of the pad than the forward end of the pad.

10. The stabilized headband of claim 1 wherein the rotation mechanism comprises one or more of a rotating member, retaining ring, spring, and retaining pin to enable rotation about the at least one rotation axis.

11. The stabilized headband of claim 1 wherein the rotation mechanism enables the at least one pad to rotate so that the at least one pad is substantially aligned with the one of the first and second ends of the headband.

12. The stabilized headband of claim 3 wherein the hinge mechanism comprises a retaining pin to enable pivoting about the hinge axis and a knuckle received by a rotating member and retained by the retaining pin.

13. A personal communications headset, comprising: a headband having a first end and a second end;
   a first pad pivotably and rotatably attached to the headband proximate to the first end of the headband and having a first contoured surface to engage a head of a user at a first contact region, wherein:
   the first pad is pivotably attached to the headband proximate to the first end of the headband using a pivot mechanism provided by a part so that the first pad is pivotable about at least one pivot axis;
   the first pad is rotatably attached to the headband proximate to the first end of the headband using a rotation mechanism provided by another part so that the first pad is rotatable about at least one rotation axis; and
   wherein said part is within said another part and surrounded by a housing;
   a second pad pivotably and rotatably attached to the headband proximate to the second end of the headband and having a second contoured surface to engage the head of the user at a second contact region;
   a first in-ear headphone attached to the headband between the first end and the first pad; a second in-ear headphone attached to the headband between the second end and the second pad;
   a boom microphone attached to the headband; and
   wherein each of the first and second in-ear headphones is configured to generate an audio signal in response to a received communications signal.

14. The personal communications headset of claim 13 wherein:
   the first pad is pivotably coupled to the headband using a first pivot mechanism and the second pad is pivotably coupled to the headband using a second pivot mechanism, each of the first and second pivot mechanisms configured to enable the first and second pads, respectively, to pivot about at least a pivot axis relative to the headband; and
   the first pad is rotatably coupled to the headband using a first rotation mechanism and the second pad is rotatably coupled to the headband using a second rotation mechanism, each of the first and second rotation mechanisms configured to enable the first and second pads, respectively, to rotate about at least a rotation axis relative to the headband.

15. The personal communications headset of claim 13 wherein each of the first and second pads has a forward end and a back end, and wherein the first and second pads are pivotably and rotatably attached to the headband at locations on the first and second pads closer to the back ends than the forward ends.

16. The personal communications headset of claim 13 wherein each of the first and second pivot mechanisms comprises a hinge mechanism to enable at least partial pivoting about a hinge axis.

17. The personal communications headset of claim 13 wherein the first contoured surface substantially matches a contour of the head in the first contact region and the second contoured surface substantially matches the contour of the head in the second contact region.

18. The personal communications headset of claim 13 wherein the headband includes an arcuate section extending between the first and second ends and wherein each of the first and second pads is pivotably attached to the headband at a position behind the arcuate section when the personal communications headset is worn on the head of a user.

19. The personal communications headset of claim 13 wherein, when the personal communications headset is worn on the head of a user, an arcuate section of the headband is further forward on the head than the first and second ends of the headband.

20. The personal communications headset of claim 14 wherein the first and second rotation mechanisms enable the first and second pads to rotate, respectively, so that the first pad is substantially aligned with the first end of the headband and the second pad is substantially aligned with the second end of the headband.

21. A stabilized headband, comprising:
   a pivot mechanism provided by a part so that at least one pad is pivotable about at least one pivot axis the at least one pad being pivotably coupled to one of first and second ends of the headband, wherein the pivot mechanism is protected by a housing; and
   a rotation mechanism provided by another part so that the at least one pad is rotatable about at least one rotation axis the at least one pad being rotatably coupled to the one of the first and second ends of the headband, wherein the rotation mechanism is protected by the housing wherein said part is within said another part.

22. The stabilized headband of claim 21 wherein the at least one pad has a forward end and a back end, and wherein the pivot and rotation mechanisms are disposed at a location closer to the back end of the pad than the forward end of the pad.

23. The stabilized headband of claim 21 wherein the pivot mechanism comprises a hinge mechanism to enable pivoting about a hinge axis and the rotation mechanism comprises a rotating member to enable rotation about the at least one rotation axis.

24. The stabilized headband of claim 1 wherein the headband includes an arcuate section which, when the headband is worn on the head of the user, lies in an arcuate section plane that defines an approximately 15° angle with respect to a vertical plane.

* * * * *